United States Patent [19]

Schiller

[11] Patent Number: 4,711,771

[45] Date of Patent: Dec. 8, 1987

[54] PROCESS AND APPARATUS FOR COOLING A GASEOUS STREAM BEFORE AND/OR DURING ITS COMPRESSION

[75] Inventor: Helmut Schiller, Munich, Fed. Rep. of Germany

[73] Assignee: Linde Aktiengesellschaft, Wiesbaden, Fed. Rep. of Germany

[21] Appl. No.: 590,301

[22] Filed: Mar. 16, 1984

[30] Foreign Application Priority Data

Mar. 16, 1983 [DE] Fed. Rep. of Germany ....... 3309322

[51] Int. Cl.[4] .............................................. C01C 1/04
[52] U.S. Cl. ...................................... 423/359; 62/20; 62/23; 62/27; 422/148; 423/392; 423/403; 423/405; 423/659; 423/DIG. 6
[58] Field of Search ................ 423/359, 392; 422/148; 62/121, 20, 23, 27

[56] References Cited

U.S. PATENT DOCUMENTS

| 1,521,138 | 12/1924 | Van Nuys | 62/27 |
| 1,735,342 | 11/1929 | Taylor et al. | 423/392 |
| 1,840,063 | 1/1932 | Taylor | 423/392 |
| 2,135,733 | 11/1938 | Richardson | 423/392 |
| 2,786,626 | 3/1957 | Redcay | 62/305 |
| 2,929,548 | 3/1960 | Crooks et al. | 423/359 |
| 2,937,506 | 5/1960 | Stirlen | 62/121 |
| 3,356,453 | 12/1967 | Miller | 423/392 |
| 3,615,200 | 10/1971 | Konoki | 422/148 |
| 3,672,182 | 6/1972 | Stowasser et al. | 62/121 |

FOREIGN PATENT DOCUMENTS 2801408  7/1979  Fed. Rep. of Germany .

OTHER PUBLICATIONS

James R. Fair, "Designing Direct-Contact Coolers/Condensers", Chemical Engineering, Jun. 12, 1972, pp. 91–100.
Perry, *Chemical Engineers' Handbook*, Third Edition (1950), McGraw-Hill Book Co., pp. 1258–1261.
European Patent Application 0073097, published Mar. 2, 1983.

*Primary Examiner*—John Doll
*Assistant Examiner*—Wayne A. Langel
*Attorney, Agent, or Firm*—Millen & White

[57] ABSTRACT

The invention relates to the compression of a gaseous stream 1. The stream 1 is cooled by a liquid 15 that evaporates at least partially in the gaseous stream. The injected liquid has a composition different from that of the gas to be compressed, and is a component employed in the process in which compression is required and conducted. Alternatively, the liquid is selected from the starting materials to be employed in the process.

4 Claims, 13 Drawing Figures

PROCESS AND APPARATUS FOR COOLING A GASEOUS STREAM BEFORE AND/OR DURING ITS COMPRESSION

BACKGROUND OF THE INVENTION

This invention relates to a process for cooling a gaseous stream before and/or during compression by introducing a liquid which evaporates at least partially in the gaseous stream, as well as to an apparatus for performing the process.

It is known from the prior art that the heat of compression produced during the compression of a stream of gas can be removed by injecting a condensate of this gas into the compressor. In the compressor, the condensate evaporates by removing heat from the gaseous stream to be compressed. This process is utilized for the compression of steam by using water as the injected cooling liquid. Another such process is disclosed in Offenlegungsschrift No. 28 01 408 wherein a cooling fluid injected into a compressor is cooled by injection of a liquid. The liquid consists of a mixture of oil and a liquified portion of the cooling fluid. Cooling of the gaseous stream to be compressed is effected by evaporation of the liquified cooling fluid, whereas the oil is utilized for lubrication and sealing of the compressor.

In these prior art processes, it has been a requirement that the condensate injected as the cooling liquid must have essentially the same composition as the gaseous stream to be cooled. This is because the gas would be contaminated if the evaporating liquid had another composition. However, this is an undesirable restriction. In addition, an optimum cooling may not be possible when using a condensate that has the same composition as the gaseous stream to be compressed, depending on the pressure and temperature of the gas to be compressed during compression. On the other hand, if injection of a liquid of another composition were possible, this would bring optimum results because a liquid having a high heat of evaporation, with respect to the gas to be cooled, can be chosen. Moreover, if the boiling points of the main components of the gas and the liquid could be chosen to differ considerably, and as a result the partial pressure of the evaporating liquid is substantially reduced, this results in a Joule-Thomson cooling effect.

SUMMARY OF THE INVENTION

Thus, this invention has as an object developing a process of the type discussed above wherein the number of liquids capable of being used for cooling purposes is broadened.

Upon further study of the specification and appended claims, further objects and advantages of this invention will become apparent to those skilled in the art.

These objects are attained according to this invention by providing that the liquid which is injected has a composition different from that of the gas to be compressed and is preferably a liquid obtained by being withdrawn from a part of the overall process itself, in the scope of which compression is required, or from the starting materials for the overall process. Moreover, also gases which are present in the process and which are cooled and liquified can be injected.

More specifically, in the process of this invention, a cooling liquid is used which is already present in the total process wherein the compression is performed.

The process of this invention offers the advantage that the choice of liquid includes not only a cooling liquid, the composition of which corresponds to that of the gas to be compressed, but can also embrace an even greater number of cooling liquids. It is possible in this manner, for example, to achieve a far more effective cooling action since a cooling liquid can be chosen, the physical characteristics of which lie, during phase transition, optimally within a desired range. By directly introducing cooling liquid during compression, the requirement of indirect heat-exchange devices and additional, auxiliary cooling cycles is eliminated. The condensed liquid evaporates at least inpart upon entering into the compressed gaseous stream so that the enthalpy difference of evaporation is utilized. Preferably the injected liquid is introduced under conditions under which all of it is evaporated in the gas stream to be compressed. In order to prevent any unevaporated liquid from entering the compressor, a mist separator is provided in the suction line of the compressor.

In an advantageous embodiment of the process of this invention, a liquid is utilized which is a product of a reaction to be conducted after compression. Examples of such a process application are in its use in synthesis reactions, such as methanol or ammonia synthesis wherein, for example, liquefied synthesis product is introduced as the cooling liquid.

In these conventional synthesis reactions, synthesis feed gas containing the components required to conduct the synthesis as well as, in some cases, proportions of inert materials and residual traces of impurities, is compressed to the pressure required to conduct the synthesis. After the conventional pretreatments which may be necessary, such as, for example, separation of undesired components, heating, etc., the compressed synthesis feed gas is fed to the reactor wherein the synthesis reaction is conducted. The product obtained in the synthesis reaction is then withdrawn from the plant, optionally after additional process steps, e.g., cooling and separation of unreacted components. Since the pressures during synthesis reactions are very high, e.g., typical pressure values in the methanol synthesis range are at approximately 100 bar, and in the ammonia synthesis at approximately 250 bar, a large portion of the energy required for conducting the process is determined by the compressor power to be expended for compressing the fresh synthesis gas (i.e., the synthesis feed gas) to the required process pressure. By introducing the condensed product from the synthesis reaction into the synthesis feed gas, the intake temperature during compression is lowered, thereby reducing the specific compression work necessary. More particularly, the amount of work required is rated to be proportional to the intake temperature of the compressor. The evaporated product liquid in the fresh (i.e., feed) synthesis gas is then separated upstream of the synthesis reactor by partial condensation, preferably at cooling water temperatures, i.e., approximately 10°–35° C.

In a further preferred development of the process of this invention, the liquid and the gas respectively used for cooling and being compressed are utilized as the starting materials for a reaction to be conducted after the compression step. The reaction preferably involves a catalytic or non-catalytic chemical reaction, with one example of such a reaction being the injection of $NH_3$ upstream of and/or into an air compressor in nitric acid production.

Since the cooling liquid introduced, as well as the compressed gas, are required in the reaction, the introduction of the liquid not only avoids interference with the total course of the process, but also serves, besides for cooling, for the production of the reaction mixture.

In another preferred embodiment of the process of this invention, the liquid employed as the cooling liquid is a compound which is inert when present in a reaction, typically to be performed after compression. This compound does not deleteriously affect subsequent process steps. In this operation of the process, the condensate passes through a subsequent reaction without itself participating as a reactant.

In addition, or alternatively to the inert behavior of the evaporated liquid during a subsequent reaction, a cooling liquid is to be employed which does not deleteriously affect subsequent process steps, such as, for example, conventional purification stages or separating devices, perhaps by formation of undesired deposits or intermediate products.

In another embodiment of the process of this invention, an intermediate product is utilized as the liquid which is obtained as a result of the process, within the scope of which compression is conducted. One example of such an embodiment is a process for the compression of a mixture in a refrigeration cycle wherein a cooling liquid is employed which contains a component or a portion of the components of the refrigerating mixture. In this case this component is obtained, for example, by partial condensation of the compressed gaseous stream. It is then reintroduced to the gaseous stream to effect cooling thereof.

In another advantageous embodiment of the process of this invention, compression of the gas is conducted in at least two compressor groups, and liquid is introduced at least upstream of one of the compressor groups. If liquid is introduced at several points, the liquid is preferably conducted in parallel to the respective feed points of the compressor groups.

Each compressor group comprises one or several compressor stages wherein, in the case of a turbocompressor, each compressor stage is comprised essentially of an impeller and guide vanes. The number of compressor groups depends in each case on the particular type of gas to be compressed.

It is also advantageous, in another development of the process of this invention, at a point after at least one of the compressor groups, upstream of which the liquid is introduced, to withdrawn compressed gas, cool it, at least partially condense it, and return the condensed proportion to the intake side and/or to one or several intermediate points in the compression route. This recycling of condensate provides additional cooling of the gas to be compressed, depending on the location where recycling is effected, either at the compressor or inlet or during compression. If the injection is performed at several intermediate points, the isothermal conditions are approached to arrive at the path requiring the least amount of input work. Thereby, the delivery or inlet head at each stage can be increased to result in a reduction of the total number of stages required in the compressor.

If compression is performed in more than one compressor group, a large variety of different possibilities are obtained for the installation employed to effect the process. For instance, the condensed product can be introduced into the intake side of one or several compressor groups. In addition, after each compressor group, the compressed, condensed product can be branched off and returned to the intake side and/or to one or several intermediate points of one compressor group or of several compressor groups. In this light, it is especially expedient to effect the return to the intake side and/or at one or at several intermediate points of the immediately preceding compressor group.

The apparatus for conducting the process of this invention comprises, in one embodiment, a compressor in communication on its intake side with a feed conduit for gas to be compressed. The compressor is constructed of at least one housing having at least one impeller arranged therein. The compressor being characterized in that, upstream of the housing and/or between two impellers, feed means or a feeding device for a liquid is connected to the compression route of the gas to be compressed by the compressor.

In a more advantageous further development of the apparatus of the invention, the feed means or feeding device is a nozzle.

In another advantageous development of the apparatus of the invention, the feeding device is a mass transfer apparatus. Both the nozzle type as well as the mass transfer apparatuses are conventional and known to those of ordinary skill in the art. Examples of these types of devices are discussed in Chemical Engineering, June 12, 1982; pages 91–100 and FIGS. 4, 5 and 11, whose disclosure is incorporated herein by reference.

According to another embodiment of the present invention, the housing of the compressor comprises, at least at one intermediate point, an outlet port and a reentry port for gas to be compressed. The feed means or feeding device connects between the outlet port and the reentry port into the compression route.

It is also proposed to arrange a conduit at the outlet of the housing on the high pressure side or compressed flow side. This conduit contains a cooler and a separator and is connected for providing a return to the intake side, and/or at an intermediate point, into the housing of the compressor or into a preceding housing of another compressor.

DETAILED DISCUSSION

Identical reference numerals are utilized in the figures for analogous components.

Figure 1:
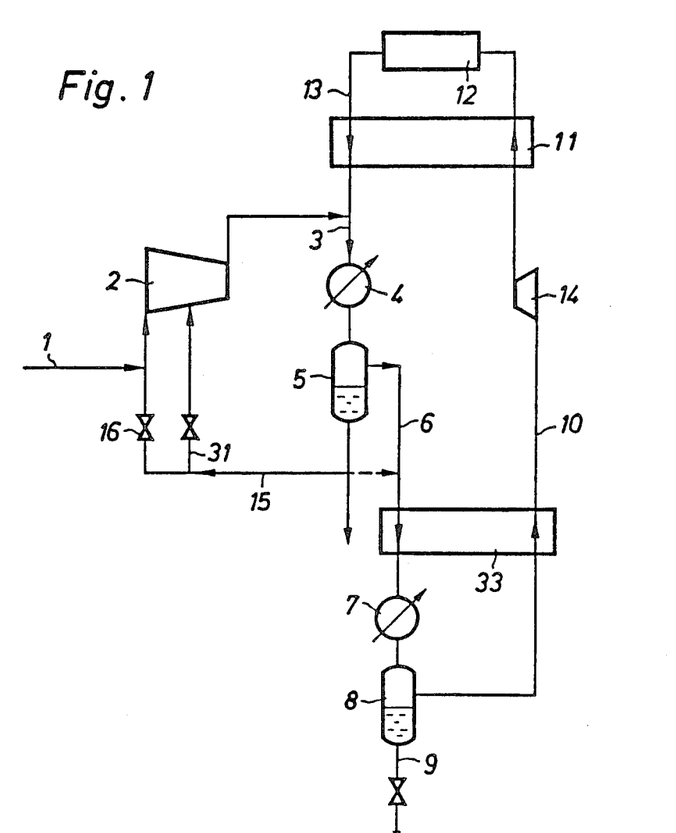
FIG. 1 is a schematic diagram of a process scheme of the invention as applied in conducting a synthesis reaction.

FIG. 1 shows in a schematic view a process of this invention, for example, as applied in an ammonia synthesis process. All of the process steps not contributing toward and understanding of the invention, such as, for example, purifying steps, purge gas separation, etc., have been omitted from the discussion herein.

A synthesis gas inlet gas 1 carrying a gas composed essentially of $H_2$ and $N_2$ in a proportion of 3:1, is fed to a compressor 2 wherein it is compressed from an initial pressure of about 30 bar to a pressure of about 230 bar. The thus-compressed inlet synthesis gas is then mixed with product gas flowing through conduit 13 obtained from the synthesis reaction conducted in a reactor 12. The thus-produced mixture flowing in conduit 13 is cooled in a cooler 4 and thereby partially condensed. In a subsequently arranged separator 5, phase separation is performed, the gaseous proportion 6, from this separator 5, possibly together with a condensed proportion which flows through the conduit shown in dashed lines, is further cooled in a countercurrent heat exchanger 33 and in a cooler 7 and is thus partially liquefied again, i.e., only higher boiling (heavier) components of the gas are liquified. Phase separation is then conducted in a separator 8. The liquid phase, consisting essentially of the ammonia product, is withdrawn through process outlet conduit 9 and then expanded resulting in the processed outlet material.

With respect to the gaseous phase withdrawm from separator 8, it has a composition similar to that of the synthesis inlet gas. This gaseous phase is removed through conduit 10, heated in countercurrent heat exchanger 33, and after compression in a second compressor 14 and heating in a heat exchanger 11 in heat exchange with product gas from the synthesis, is fed to a synthesis reactor 12 wherein reaction of $H_2$ and $N_2$ to $NH_3$ is conducted. This product gas leaves the reactor 12 through conduit 13 and is then cooled in heat exchanger 11.

Afer the product gas 13, as described above, has been mixed with the compressed synthesis inlet gas, the mixture is then partially condensed to thus obtain essentially only ammonia, i.e., more than 90%, in the liquid phase.

According to the invention of this embodiment, a portion, i.e., the quantity depends on various parameters such as the pressure ratio of the compressor and the temperature of the gas at the feeding point, of the condensate is fed through conduit 15 to an expansion device 16, i.e., injection nozzle, and expanded therein to the intake pressure of the compressor 2 and then injected on the intake side of the compressor 2 into the syntheis inlet gas 1. As a result, the temperature of the inlet synthesis gas 1 is lowered on the intake side.

In addition, a portion of the condensed synthesis product from separator 5 can also be introduced through a conduit 31 into the compressor 2 at an intermediate point. By introducing the liquid at an intermediate point (or at several intermediate points) the gas to be compressed is cooled during its compression. Thus, the compression becomes appoximately isothermal.

In this embodiment it is preferred that a turbocompressor be employed as the compressor 2. The distance from the point of the injection to the inlet of the compressor 2 is dimensioned so that the injected liquid has evaporated by the time it enters the compressor 2. The distance calculated for injection is determined in a conventional manner. A mist separator, which is conventional in nature, can be provided at the compressor inlet as an additional safety measure to avoid liquid, and its attendant disadvantages as well known to those of ordinary skill in the art, occurring in the compressor 2.

Figure 2:
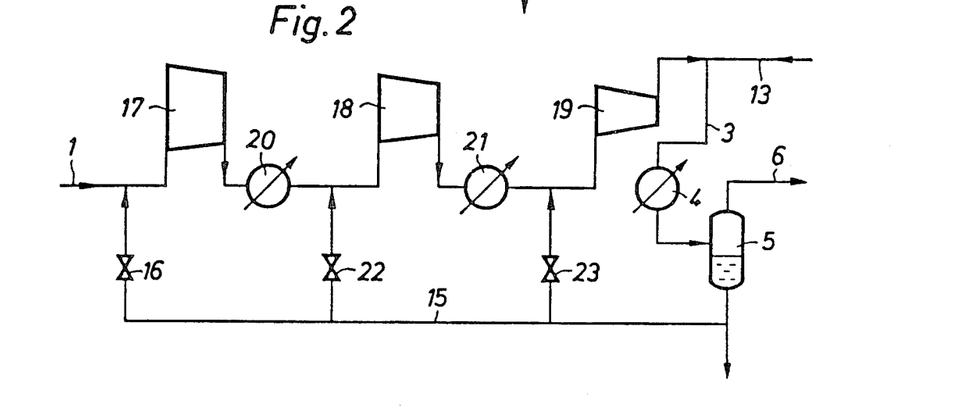
FIGS. 2–5 schematically illustrate various other embodiments of the process of FIG. 1.
Figure 3:
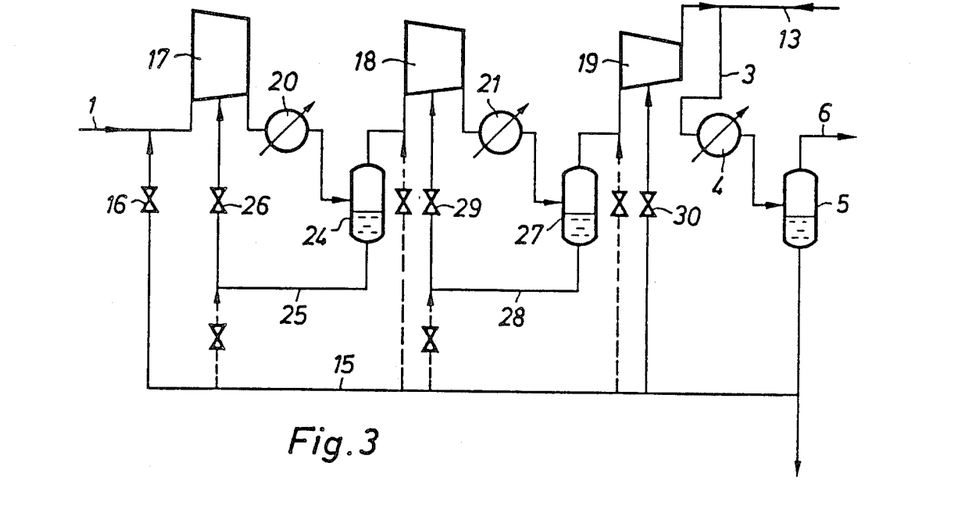

The compressor 2 can, as illustrated in FIGS. 2 and 3, be a plurality of compressor groups. In both cases, three compressor groups 17, 18 and 19 can be provided wherein the inlet gas is compressed, together with injected product gas, in succession up to the required process pressure. Downstream of the compressor group 17, the heat of compression is removed in a cooler 20. As shown in FIG. 2, a portion of the liquefied product gas from the separator 5 is sprayed, though a conventional expansion device 22, i.e., an injection nozzle, into the synthesis inlet gas on the intake side of the compressor group 18 in order to lower the temperature of the synthesis inlet gas. Analogously, the heat of compression of compressor group 18 is removed in a cooler 21 and subsequently, through another expansion device 23, a portion of the condensed product gas from separator 5 is introduced into the synthesis inlet gas on the intake side of the last compressor group 19 in order to lower the intake temperature of the synthesis inlet gas at this location. After leaving the compressor group 19, the synthesis inlet gas is mixed with the product gas 13 from the synthesis reaction, and as described in FIG. 1, fed into the cooler 4.

In contrast to FIG. 2, in the process illustrated in FIG. 3, the synthesis inlet gas, compressed in compressor group 17 and cooled in cooler 20, is partially condensed with product gas, and the thus-condensed proportion is injected through conduit 25 and the expansion device 26 at an intermediate point into the compressor group 17. If necessary, injection can also be effected at more than one intermediate point (not shown). The gaseous portion from separator 24 is further compressed in the second compressor group 18 and likewise condensed in part in the cooling device 21. The condensed portion is returned through conduit 28 and through expansion device 29 at one intermediate point, or at several intermediate points (not shown), into the compressor group 18 and the gaseous portion is brought to final pressure in the last compressor group 19 and mixed with the product gas 13 from the synthesis reaction. After cooling in the cooler 4 and undergoing phase separation in separator 5, a portion of the liquid phase is returned through an expanion device 30 into the compressor group 19, and another portion of the condensed product is fed into the synthesis inlet gas on the intake side of the first compressor group 17, and optionally on the intake side and/or at intermediate points of compressor groups 17, 18 and 19 (illustrated in dashed lines).

Figure 4:
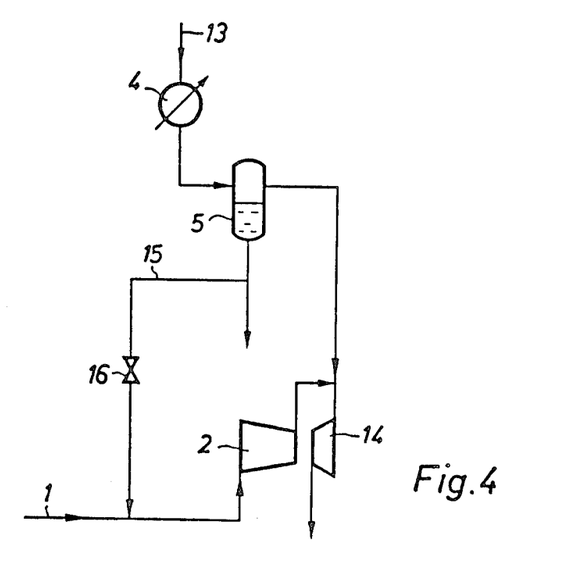

FIG. 4 shows a modified embodiment of the process of this invention. The synthesis inlet gas 1 is in this case compressed in compressor 2 and subsequently mixed with the uncondensed proportion of the product gas 13 from the synthesis. This proportion is obtained by partial condensation of the product in cooler 4 and separation of the condensate in separator 5. The mixture in then compressed in the second compressor 14 to the required pressure. The condensate from separator 5 is injected through conduit 15 into the intake side of compressor 2 and into the synthesis inlet gas flowing therethrough. This embodiment can also be employed analogously for the processes of FIGS. 2 and 3. In this case, the synthesis inlet gas would be mixed, downstream of the last compressor group 19, with the uncondensed proportion of the product gas 13 from the synthesis, and the resultant mixture would be compressed in compressor 14 to the required final pressure.

Figure 5:
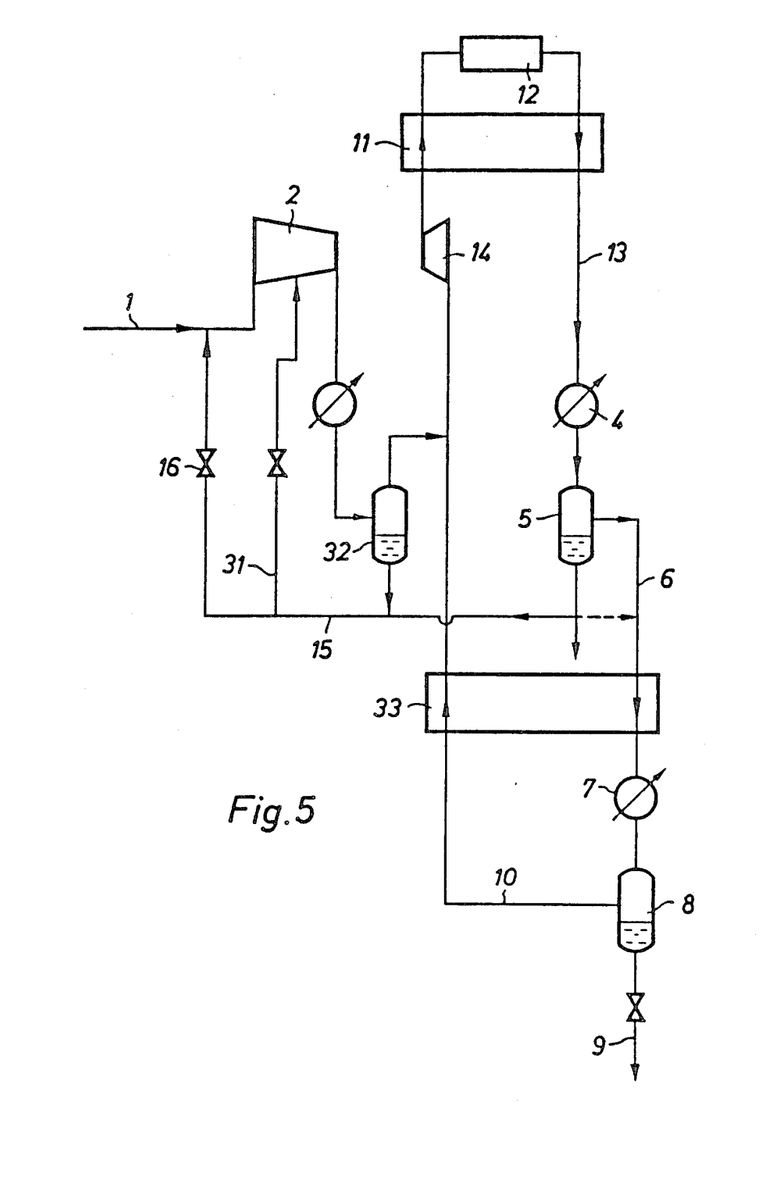

FIG. 5 illustrates another embodiment of the process of this invention. The synthesis inlet gas 1 is compressed in compressor 2 and subsequently cooled and partially condensed. The two phases are separated from each other in a separator 32. The gaseous proportion is combined with the gas 10 conducted to reactor 12. The condensed portion, consisting essentially of product liquid, is fed to the liquid product in conduit 15 and, after expansion in valve 16, injected into the synthesis inle gas to be compressed on the intake side of compressor 2. A portion of the condensed product can also be conducted through conduit 31 to the compressor 2 at an intermediate point.

The condensate is obtained by cooling and partial condensation of product 13 from synthesis reactor 12 after separation of the gaseous proportion 6 in separator 5. The gaseous proportion, as well as optionally (shown dashed arrow) a portion of the condensate from separator 5, is cooled in countercurrent heat exchanger 33, and condensed in part by further cooling in cooler 7. The condensate, consisting of liquefied product, is withdrawn through conduit 9 and the gaseous proportion is recycled through conduit 10 into the synthesis reactor 12.

This mode of conducting the process of the invention has the advantage that the quantity of the gaseous streams and thus, the heat-exhange losses in heat exchanger 33 are reduced.

Figure 6:
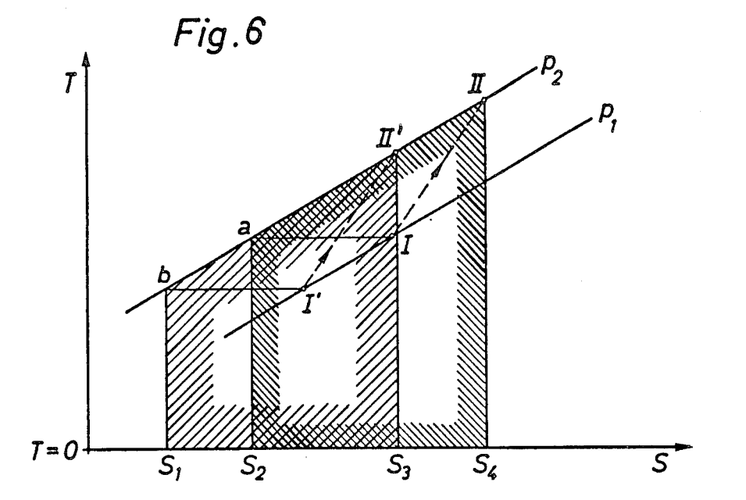
FIGS. 6 and 7 are graphs illustrating T-S (i.e., temperature vs. entropy) for the fresh gas compression when conducted according to the invention.

FIG. 6 shows the savings in specific compression work obtained by the process of this invention with an ideal gaseous mixture in an entropy (S)-temperature (T) diagram. Initially, the case without injection of liquefied product gas on the intake side is considered:

As shown, the inlet gas is brought from a condition I on isobar $p_1$ to a condition II on isobar $p_2$ by compression. The change in condition is shown by the dashed line I-II. The power to be expended to effect the compression by the compressor is, as is well known, proportional to the area of the trapezoid II-a-$S_2$-$S_4$.

In the process of this invention, the temperature of the synthesis inlet gas to be compressed is initially lowered on the intake side of the compressor. This means that the inlet gas to be compressed is in condition I' at the inlet to the compressor as opposed to condition I discussed before. At the outlet of the compressor, the inlet gas is in a condition II'. The power to be expanded for this purpose by the compressor is proportional to the area of the trapezoidal II'-b-$S_1$-$S_3$ and thus substantially less than in the case without injection.

Figure 7:
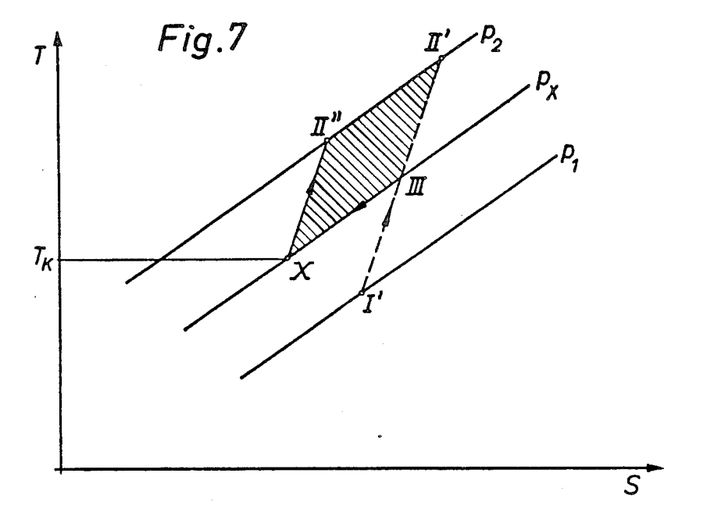

FIG. 7 illustrates the additional savings in work expanded during compression if the compressed ilet gas is initially cooled with product gas, the product gas is condensed, and returned into the compressor at an intermediate point, as shown in FIG. 3. The pressure ambient at this intermediate point is assumed to be $p_x$. Then, compression of the synthesis inlet gas from condition I' takes place initially along the line I'-II' until condition III is reached at pressure $p_x$. At that point, cooling takes place by intermediate injection down to temperature $T_K$ and subsequently further compression takes place to the final pressure $p_2$ attained in condition II''. In this manner, conditions close to isothermal compression have been attained. The thus-produced savings in work at the compressor is essentially proportional to the area of the parallelogram III-II'-II''-X.

In both the prior art as well as in the present invention (injection of a liquid of the same composition or injection of a liquid of different composition into a gas stream to be compressed) the quantitative effect in the T-S-diagram is similar. However, by choosing a cooling liquid in accordance with the invention, the cooling effect will become a maximum and the power consumption of the compressor will be minimized.

Figure 8:
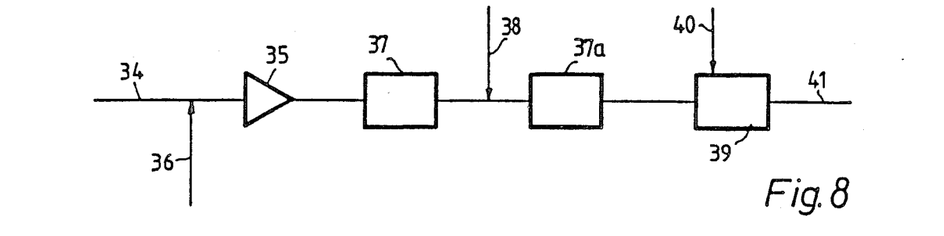
FIG. 8 is a schematic diagram illustrating the process of the invention as applied in the manufacture of nitric acid.

FIG. 8 shows an embodiment of the invention as applied to a process for nitric acid manufacture. Incoming air through conduit 34, or a gas having a composition similar to that of air, is compressed in a compressor 35 to about 5 bar. Prior to compression, liquid ammonia is introduced through conduit 36 into the gaseous stream to be compressed, i.e., a liquid which is a reactant in the subsequent nitric acid production. In a first reactor 37, which is conventional in nature, the ammonia-air mixture is reacted to NO; in a second reactor 37a, after admixing of air through conduit 38, NO from the first reactor 37 is reacted to $NO_2$. In a subsequent absorption device 39, e.g., a conventional scrubbing column, which is charged with water through line 40, nitric acid is obtained and discharged through line 41.

Figure 9:
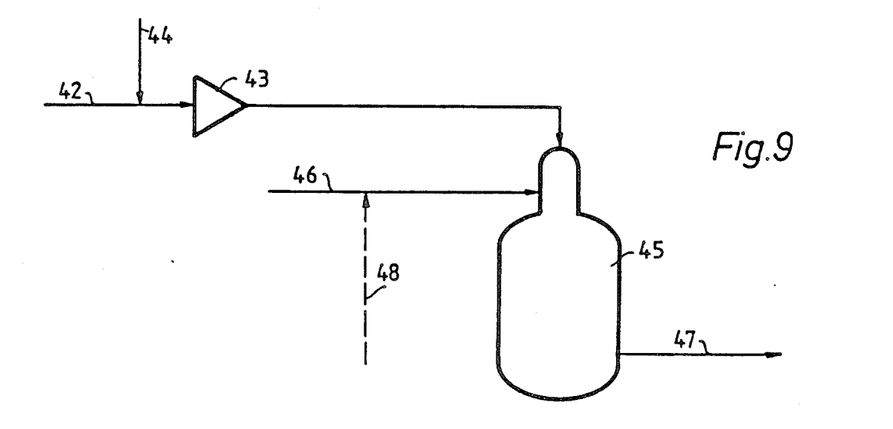
FIG. 9 is a schematic diagram illustrating an alternative application of the process scheme for partial oxidation.

In the embodiment of FIG. 9, the cooling liquid introduced prior to compression of a gaseous stream is a feedstock in a subsequent reaction, i.e., a partial oxidation. Oxygen through duct 42 is compressed in a compressor 43 to, for example, 60–90 bar, preferably about 80 bar, water is fed through line 44 in the liquid phase to the oxygen prior to compression. The resultant, compressed oxygen/steam mixture is introduced into a reactor 45, together with a feedstock made up of hydrocarbons 46, for example, oil, wherein it is reacted into a discharge stream of synthesis gas 47 (i.e., essentially CO and $H_2$). If necessary, steam 48 is also admixed to the feedstock 46 as well known to those of ordinary skill in the art.

Figure 10:
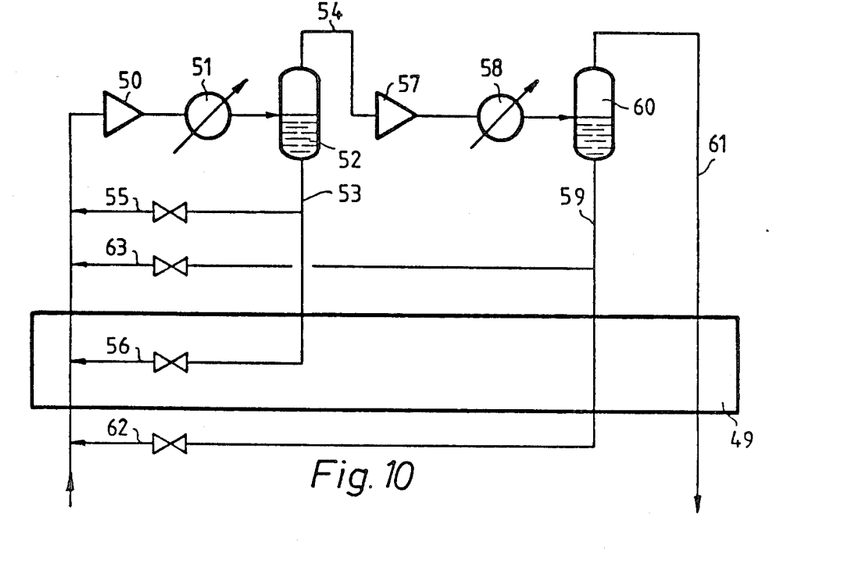
FIG. 10 is a schematic diagram illustrating a process scheme of the invention as applied for use in a mixture refrigeration cycle, for example, in a natural gas liquefaction plant.
Figure 11A:
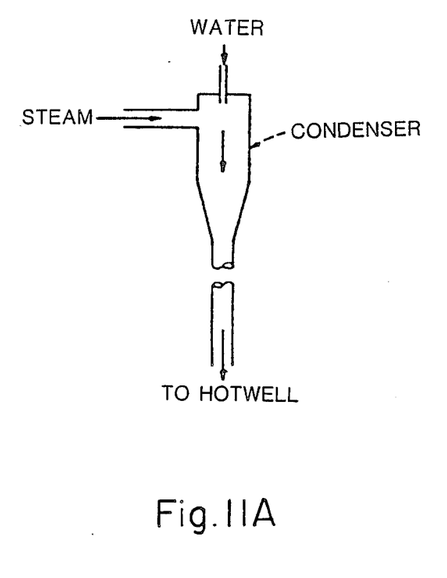
FIGS. 11A and 11B are schematic diagrams of typical nozzle type feeding devices for injecting the cooling liquid upstream of the compressor in the process of the invention.
Figure 11B:
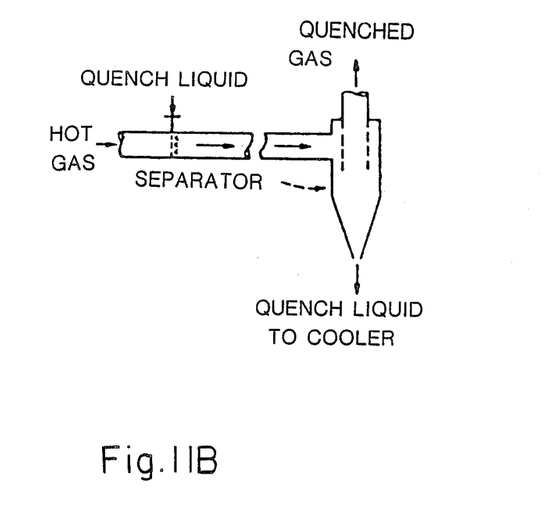
Figure 12:
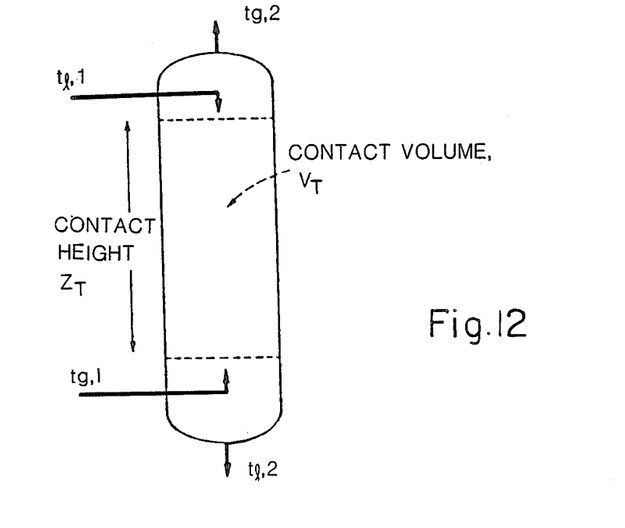
FIG. 12 is a schematic diagram of a typical mass transfer device for use as a feeding device in the process of the invention for simple gas cooling with little or no mass transfer between gas and liquid.

FIG. 10 shows a mixture refrigeration cycle containing, for example, $C_1$ to $C_5$ hydrocarbons, as utilized, for instance, in a natural gas liquefaction process. The refrigeration mixture is cooled in a heat exchanger 49 and then compressed in a compressor 50. After cooling in a recooler 51, the heavier components 53 of the refrigeration mixture are condensed in the liquid phase and are separated in a separator 52 from the remainder 54 that remains in the gaseous phase. A portion of the condensate in line 53, representing an intermediate product of the refrigeration cycle, is passed through conduit 56 and reheated in heat exchanger 49, expanded, and fed in the gaseous phase to the refrigeration mixture to be compressed. Another portion of the condensate is expanded and introduced in the liquid phase into the gaseous mixture to be compressed trough line 55.

The gaseous proportion in line 54 of the refrigeration mixture is further compressed in a compressor 57. After cooling in a recooler 58, the heavier components in line 59 of the gaseous mixture are condensed in the liquid phase and are separated in a separator 60 from the residue in line 61 that has remained in the gaseous phase. The gaseous stream in line 61 is conducted through heat exchanger 49 while the stream 59 of condensate is subdivided into two streams. One partial stream 62 is conducted through heat exchanger 49, then expanded, and fed in the gaseous phase to the refrigeration mixture to be compressed. The other partial stream 63 is admixed in the liquid phase, after expansion, to the refrigeration mixture to be compressed.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

I claim:

1. In a process for the production of ammonia wherein said process comprises compressing a gaseous stream in a synthesis reaction process wherein inlet synthesis feed gas comprising a mixture of $H_2$ and $N_2$ is fed to a compressor to be compressed thereby, the improvement comprising said inlet synthesis feed gas being cooled prior to compression by having product liquid ammonia from the synthesis reaction mixed therewith, removing the heat of compression and separating condensed product gas from the compressed mixture to then effect the synthesis reaction and recycling a portion of the liquified ammonia synthesis reaction product as said cooling liquid to be mixed with said inlet synthesis feed gas, wherein the requirement of conducting cooling with liquid external to the process is eliminated reducing the work required to effect compression.

2. A process according to claim 1, wherein said compression of said gaseous stream is conducted in at least two compressor groups, and said cooling liquid is introduced upstream of at least one of the compressor groups.

3. A process according to claim 1, comprising withdrawing compressed gas at a point downstream of at least one of the compressor groups, upstream of which liquid has been introduced, cooling and at least partially condensing the withdrawn compressed gas, and returning the condensed portion into the compression route on the intake side and/or at one or several intermediate points.

4. A process according to claim 3, wherein said returning step is conducted into the intake side and/or at one or several intermediate points of the respectively preceding compressor group.

* * * * *